Feb. 9, 1965   J. A. ZURBRIGEN ETAL   3,168,909
METHOD FOR LOCATING AND SEALING PIPE LEAKS
Original Filed April 1, 1959
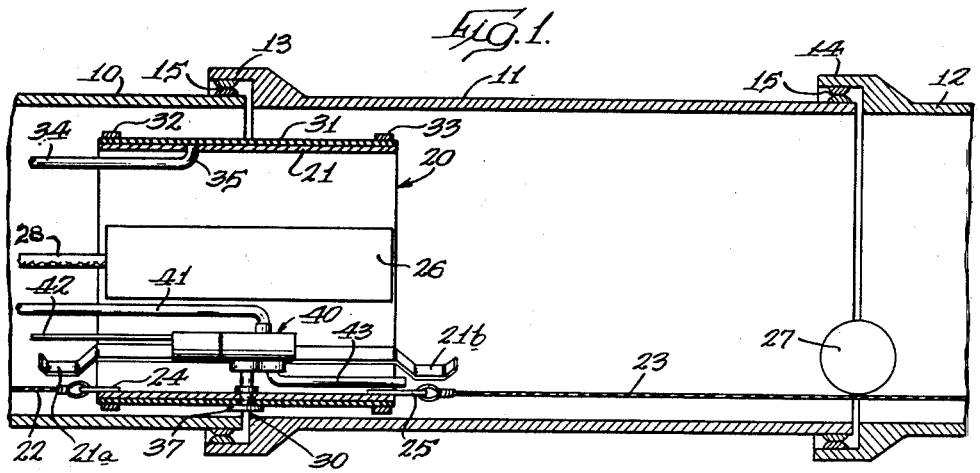
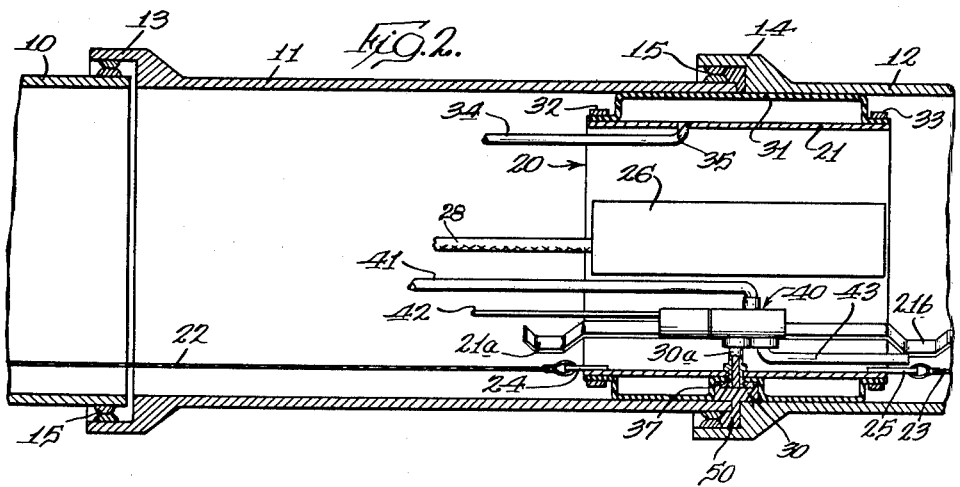
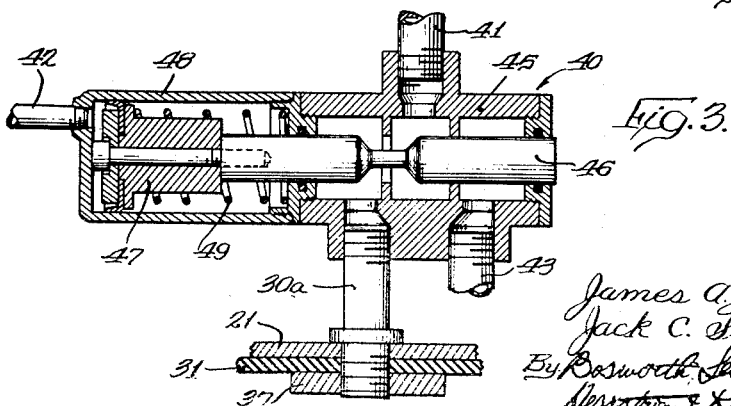
INVENTORS.
James A. Zurbrigen
Jack C. Steinsberger
By Bosworth Sessions,
Sessions & Knowles

United States Patent Office 3,168,909
Patented Feb. 9, 1965

3,168,909
METHOD FOR LOCATING AND SEALING
PIPE LEAKS
James A. Zurbrigen, Huron, S. Dak., and Jack C. Steinsberger, Deerfield, Ill., assignors to The Penetryn System, Inc., Cleveland, Ohio, a corporation of Ohio
Original application Apr. 1, 1959, Ser. No. 803,442. Divided and this application June 8, 1962, Ser. No. 201,146
12 Claims. (Cl. 138—97)

This application, which is a division of prior application Serial No. 803,442, filed April 1, 1959 for Method and Mechanism for the Internal Sealing of a Pipe Leak, relates to a method for locating and sealing a pipe leak such as may be encountered at a joint between sewer pipe sections.

Frequently a pipe such as a sewer pipe develops leaks, particularly at the joints between the pipe sections. Prior to this invention, the leak was located, one or more holes were drilled down to the pipe joint where the leak occurred and the joint was then filled with material such as cement from the exterior of the pipe. This has been an expensive and complicated solution to the problem as compared to the invention disclosed herein, in which the detection of the leak and the plugging of the leak are accomplished internally of the pipe without any exterior holes drilled down to the pipe joint.

One of the objects of the invention is to provide a method for internally sealing a pipe leak by a means of a packer with an associated television camera comprising the steps of moving the packer along the pipe until a leak is detected and a target located a fixed distance from the packer is at the leak, advancing the packer an amount equal to said fixed distance to place the packer at the leak, isolating the leak from the remainder of the pipe, and injecting a settable material into said leak to close off the leak.

Another object of the invention is to provide a method for internally sealing a pipe leak by means of a packer with associated means for detecting the location of the leak, means for injecting a leak plugging material into the leak including injection means positionable adjacent the leak, and means for isolating the area of the pipe having the leak from the remainder of the pipe including an inflatable skin on the packer movable under fluid pressure radially outwardly into circumferential contact with the pipe at either side of the injection point.

The invention is illustrated in the accompanying drawings in which:

FIG. 1 is a vertical section through a pipe and the sealing mechanism with the sealing mechanism shown in leak sighting position and with parts of the sealing mechanism shown diagrammatically;

FIG. 2 is a view similar to FIG. 1 showing the sealing mechanism at the location of the leak; and FIG. 3 is a diagrammatic vertical section on an enlarged scale of a valve mechanism carried by the sealing mechanism.

As shown in the drawings, a length of pipe such as a sewer pipe is composed of pipe sections 10, 11, and 12 which interfit at joints 13 and 14. Normally these joints are sealed in a suitable manner such as by a packing 15; however, leaks can develop in them. When the pipe is disposed in certain types of soil or locations, water can seep or leak into the pipe through an inadequately sealed joint between pipe sections.

In order to seal the leaking pipe joint, a packer, indicated generally at 20 in FIGS. 1 and 2, is provided. The packer 20 embodies a generally cylindrical casing 21 of a size somewhat less than the pipe's interior diameter so as to be movable within the pipe. The packer has tow cables 22 and 23 connected to opposite ends of the casing through connectors 24 and 25 attached to the casing. The cables extend along the pipe and pass upwardly to above the surface of the ground at spaced locations, whereby one cable may be paid out and the other taken in to result in movement of the packer along the pipe. The packer has spaced pairs of skids 21a and 21b which support the packer for sliding movement.

Means are provided for detecting a leak in the pipe comprising a commercially available closed circuit television system in which a television camera 26 and associated lights are carried by the packer casing 21 with the camera directed toward a target in the form of a ball 27 attached to cable 23 a fixed distance ahead of the packer 20. The television cable 28 extending therefrom leads to an operator's location above ground where a television receiver indicates to an operator the condition of the pipe interior as seen by the camera 26. It will thus be seen that as the cables 22 and 23 are operated to move the packer 20 along the pipe, the camera 26 will detect the location of a leak and since the camera sights the ball 27, it is possible as a result of impingement of water on the ball 27 to locate the packer 20 in a position wherein the ball 27 is adjacent the leak.

The packer 20 has an injection point, indicated generally at 30, through which material may be injected into the leak for sealing thereof. This injection point is a fixed distance from ball 27. Thus an operator, after ball 27 has been sighted at the leak, knows exactly the distance that the packer 20 must be advanced to place the injection point 30 over the leak in the position shown in FIG. 2.

The packer 20 has means for isolating the area of the pipe having a leak from the remainder thereof comprising an air impervious cylindrical skin 31, made of rubber or the like, which surrounds the casing 21 and which is clamped at its ends to the casing by rings 32 and 33. Means for directing compressed air between the casing 21 and the skin 31 includes a supply pipe 34 which extends through an opening 35 in the casing 21. As shown in FIG. 2, the expansion of the skin 31 results in contact with the inner periphery of the pipe and the skin readily adapts to out of round pipes as well as out of line joints.

A void forms in the skin at the injection point 30 when the skin is expanded, this being due to the construction at the injection point 30. This construction includes an outlet pipe 30a passing through the casing 21 having an exterior end which is threaded and which extends beyond the skin 31. A plate 37 threads onto the end of the outlet pipe 30a and is of a diameter sufficient to hold a part of the skin against expansion. This plate is tightened sufficiently to maintain the air seal between the skin 31 and the exterior of the casing 21.

With the packer located and the skin 31 expanded as shown in FIG. 2, means provided for the purpose are employed to determine the acceptance of fluid through the leak. They comprise a valve indicated generally at 40 and a fluid line 41 leading from a position above ground. Water is directed to outlet pipe 30a through the line 41 and the valve 40 to the injection point 30. The line 41 and valve 40, along with the outlet pipe 30a and injection point 30, also comprise means for injecting a leak plugging material into the pipe joint 14 after the test for fluid acceptance, this material being indicated at 50.

The leak plugging material is desirably one which is in a fluid state when initially mixed so that it can readily pass through the line 41 from above ground to the injection point 30 and then with a minimum amount of time will set to plug the leak in the pipe joint. One example of a suitable polymerizing material is the following, with percentages by weight based on a full measure of water: (1) Acrylamide methylene bis acrylamide—12% by weight, (2) Ammonium persulfate—.5% by weight, (3) Nitrilotrispropionamide—.8%, and the balance water. This mixture may also have an addition of clays or abestos fibers or other miscellaneous fillers.

After plugging of the leak with the plugging material, the valve 40 holds the plugging material behind the injection point 30 until the plugging material has set. Thereafter the skin 31 is deflated by permitting the air to escape through the line 34. Water may then be forced through the line 41 and the valve 40 to blow the injection point 30 clean and the packer is then ready for the next leak.

A suitable valve is shown in FIG. 3 in which the lines 41 and 42 connect to a valve casing 45 and outlet lines 30a and 43 also connect to the casing. A valve stem 46 is movably mounted within the casing and when positioned as shown in FIG. 3 connects the line 41 to the injection point 30. The valve stem 46 may shift toward the right, blacking off outlet line 30a and connecting the line 41 with the outlet line 43.

The valve stem 46 is connected to a piston 47 mounted in a cylinder 48 and the piston is urged toward the left, as viewed in FIG. 3, by a spring 49 whereby the valve stem 46 is normally positioned as shown in the figure. When water or other liquids enters through the line 42, the piston 47 is shifted toward the right against the spring 49 to shift the valve stem 46 to the right and thus place the line 41 in communication with the outlet line 43 and close off the outlet line 30a to the injection point 30.

It is believed that from the foregoing description the method will be entirely clear; however, it may be briefly summarized as follows. The packer is drawn through the pipe with the cables 22 and 23 until a leak is observed by the camera 26, the ball 27 is positioned at the leak, and the measurement is then taken. The packer is then moved ahead a distance equal to the distance between the ball 27 and injection point 30 to locate the injection point 30 directly over the leak. Compressed air is then passed through the line 34 to expand the skin 31 into close contact with the pipe on either side of the leak.

After the skin is expanded, water is pumped through the line 41 and the valve 40 to the injection point 30 to determine the acceptance of fluid through the leak. After this is determined, a predetermined quantity of the plugging material is mixed and is passed through the line 41 and the valve 40 to the injection point 30. After sufficient material has been placed in the joint to seal the leak, the valve 40 is shifted by hydraulic pressure on the exposed face of the piston 47 and this causes the flow from line 41 to be wasted through outlet line 43. This holds the plugging material behind the injection point until the material sets.

After the material has set, the skin 31 is deflated by permitting the air to escape through the pipe 34. The valve 40 is then returned to its original position by releasing the hydraulic pressure in line 42 and water is forced through line 41 to the valve 40 to blow the injection means clean of the plugging material. The packer is then ready to be moved along the pipe to detect and seal the next leak.

The foregoing detailed description is given for clearness of understanding and no unnecessary limitations should be understood therefrom, as modifications will be obvious to those skilled in the art.

We claim:

1. A method for internally sealing a pipe leak by means of a packer comprising moving the packer along the interior of the pipe until a target located a fixed distance ahead of the packer is at the leak; advancing the packer by an amount equal to said fixed distance to place the packer at the leak; isolating the leak from the remainder of the pipe; and injecting a settable material into the leak from the interior of the packer.

2. The method of detecting the location of a fluid infiltration fault in a subterranean pipe line extending generally parallel to the ground surface comprising the steps of drawing along the pipe line between two axially spaced access openings a sensing unit adapted for movement parallel to the axis of the pipe line and provided with a target disposed a known distance therefrom; receiving signals from the sensing unit indicative of the conditions existing in the pipe line; and measuring the distance from the target to a selected reference point.

3. The method of detecting the location of a fluid infiltration fault in a subterranean pipe line extending generally parallel to the ground surface comprising the steps of drawing along the pipe line between two axially spaced access openings a sensing unit adapted for movement parallel to the axis of the pipe line and provided with a target disposed a known distance therefrom; receiving signals from the sensing unit indicative of the conditions existing in the pipe line; and determining the target position at a time when the target is judged to be adjacent a fluid infiltration fault.

4. A method for internally sealing a pipe leak with a packer having a television camera comprising, moving the packer along the interior of the pipe until a leak is detected by the camera and a target located a fixed distance ahead of the packer is at the leak, advancing the packer by an amount equal to said fixed distance to place the packer at the leak, isolating the leak from the remainder of the pipe, and injecting a settable material into the leak from the packer.

5. A method for internally sealing a leak in a pipe with a packer having a television camera comprising: moving the packer along within the pipe until a leak is detected by the camera and a target a fixed distance from the packer is at the leak, advancing the packer by an amount equal to said fixed distance to locate injection means on the packer at the leak, expanding a skin substantially surrounding the packer into contact with the pipe on either side of the leak, passing a settable material through the injection means to plug the leak, and after said material has set contracting the skin and removing the packer.

6. The method of detecting, locating and injecting a settable sealant into a fluid infiltration fault in a pipe line extending generally parallel to the ground surface comprising the steps of drawing along the length of the pipe line between two axially spaced access openings a television camera unit having a television camera disposed with its optical axis extending generally along the axis of the pipe line and having a target disposed a known fixed distance from the television camera in the field of view thereof to be imaged by the television camera along with the image of the pipe line; observing the image produced by the television camera at a television monitor located above the ground surface and receiving image producing signals from the television camera to detect the conditions existing in the interior of the pipe line; locating the fault site with the aid of the target; aligning therewith injection means for supplying sealant; and injecting sealant under pressure into the fault site.

7. The method of detecting, locating and injecting a settable sealant into a fluid infiltration fault in a pipe line extending generally parallel to the ground surface comprising the steps of drawing along the length of the pipe line between two axially spaced access openings a television camera unit having a television camera disposed with its optical axis extending generally along the axis of the pipe line and having a target disposed a known fixed distance from the television camera in the field of view thereof to be imaged by the television camera along with the image of the pipe line; observing the image produced by the television camera at a television monitor located above the ground surface and receiving image producing signals from the television camera to detect the conditions existing in the interior of the pipe line; locating the fault site with the aid of the target; aligning therewith injection means for supplying sealant to the fault site from the interior of the pipe line; and injecting sealant under pressure into the fault site.

8. The method of detecting, locating and injecting a settable sealant into a fluid infiltration fault in a pipe line extending generally parallel to the ground surface comprising the steps of drawing along the length of the pipe line between two axially spaced access openings a television camera unit having a television camera disposed with its optical axis extending generally along the axis of the pipe line and having a target disposed a known fixed distance from the television camera in the field of view thereof to be imaged by the television camera along with the image of the pipe line; observing the image produced by the television camera at a television monitor located above the ground surface and receiving image producing signals from the television camera to detect the conditions existing in the interior of the pipe line; locating the fault in the pipe line with the aid of the target; aligning therewith injection means for supplying sealant; isolating the fault from the remainder of the pipe line; and injecting sealant under pressure into the fault site.

9. The method of detecting, locating and injecting a settable sealant into a fluid infiltration fault in a pipe line extending generally parallel to the ground surface comprising the steps of drawing along the length of the pipe line between two axially spaced access openings a television camera unit having a television camera disposed with its optical axis extending generally along the axis of the pipe line and having a target disposed a known fixed distance from the television camera in the field of view thereof to be imaged by the television camera along with the image of the pipe line; observing the image produced by the television camera at a television monitor located above the ground surface and receiving image producing signals from the the television camera to detect the conditions existing in the interior of the pipe line; locating the fault in the pipe line with the aid of the target; aligning therewith injection means for supplying sealant; isolating the fault inwardly of the fault site by expanding an inflatable element into engagement with the interior of the pipe line; and injecting sealant under pressure into the fault site.

10. The method of detecting, locating and injecting a settable sealant into a fluid infiltration fault in a pipe line extending generally parallel to the ground surface comprising the steps of drawing along the length of the pipe line between two axially spaced access openings a television camera unit having a television camera disposed with its optical axis extending generally along the axis of the pipe line and having a target disposed a known fixed distance from the television camera in the field of view thereof to be imaged by the television camera along with the image of the pipe line; observing the image produced by the television camera at a television monitor located above the ground surface and receiving image producing signals from the television camera to detect the conditions existing in the interior of the pipe line; locating the fault in the pipe line with the aid of the target; aligning therewith injection means for supplying sealant to the fault site from the interior of the pipe line; isolating the fault inwardly of the fault site by expanding an inflatable element into engagement with the interior of the pipe line; and injecting sealant under pressure into the fault site.

11. The method of detecting the location of any fluid infiltration faults and the like in subterranean pipe lines extending generally parallel to the ground surface comprising the steps of drawing along the length of a subterranean pipe line between two axially spaced access openings at the opposite ends of the pipe line a television camera unit having a television camera disposed with its optical axis extending generally along the axis of the pipe line and having a target disposed a known fixed distance from the television camera in the field of view thereof to be imaged by the television camera along with the image of the pipe line interior, observing the image produced by the television camera at a television monitor located above the ground surface and receiving image producing signals from the television camera to detect the conditions existing in the pipe line adjacent the target, and when the target is adjacent a fluid infiltration fault establishing the location of the fault site by taking the target position measurement.

12. The method of detecting the location of any fluid infiltration faults and the like in subterranean pipe lines extending generally parallel to the ground surface comprising the steps of drawing along the length of a subterranean pipe line between two axially spaced access openings a television camera unit having a television camera disposed with its optical axis extending generally along the axis of the pipe line and having a target disposed a known fixed distance from the television camera in the field of view thereof to be imaged by the television camera along with the image of the pipe line interior, observing the image produced by the television camera at a television monitor located above the ground surface and receiving image producing signals from the television camera to detect the conditions existing in the pipe line adjacent the target, and determining the target position when the target is adjacent a fluid infiltration fault.

References Cited by the Examiner

UNITED STATES PATENTS

| 2,894,539 | 7/59 | Cook | 138—97 |
| 2,971,259 | 2/61 | Hahnau | 178—6 |

DAVID G. REDINBAUGH, *Primary Examiner.*